US012759263B2

(12) United States Patent
Adelson et al.

(10) Patent No.: US 12,759,263 B2
(45) Date of Patent: Oct. 13, 2026

(54) ABRASION-RESISTANT COMPOSITE

(71) Applicant: GelSight, Inc., Waltham, MA (US)

(72) Inventors: Edward H. Adelson, Winchester, MA (US); F. Richard Cottrell, Westport, MA (US)

(73) Assignee: GelSight, Inc., Waltham, MA (US)

( * ) Notice: Subject to any disclaimer, the term of this patent is extended or adjusted under 35 U.S.C. 154(b) by 45 days.

(21) Appl. No.: 18/428,467

(22) Filed: Jan. 31, 2024

(65) Prior Publication Data

US 2024/0217207 A1 Jul. 4, 2024

Related U.S. Application Data

(63) Continuation of application No. PCT/US2022/039138, filed on Aug. 2, 2022.
(Continued)

(51) Int. Cl.
*B32B 7/022* (2019.01)
*B32B 27/06* (2006.01)
*B32B 27/28* (2006.01)

(52) U.S. Cl.
CPC .............. *B32B 7/022* (2019.01); *B32B 27/06* (2013.01); *B32B 27/283* (2013.01);
(Continued)

(58) Field of Classification Search
CPC ............ B32B 2250/02; B32B 2274/00; B32B 2307/41; B32B 2307/412; B32B 2307/51; B32B 2307/536; B32B 2307/54; B32B 2307/554; B32B 2307/5825; B32B 2307/732; B32B 2307/7376; B32B 2307/746; B32B 25/042; B32B 25/08; B32B 25/14; B32B 25/20; B32B 27/06;
(Continued)

(56) References Cited

U.S. PATENT DOCUMENTS 7,105,607 B2 9/2006 Chen
7,226,484 B2 6/2007 Chen
(Continued)

FOREIGN PATENT DOCUMENTS

CN 1882796 12/2006
CN 101808781 8/2010
(Continued)

OTHER PUBLICATIONS

WIPO, "PCT Application No. PCT/US22/39138 International Preliminary Report on Patentability mailed Feb. 15, 2024", 6 pages.
(Continued)

*Primary Examiner* — Lawrence D Ferguson
(74) *Attorney, Agent, or Firm* — Strategic Patents, P.C.

(57) ABSTRACT

A composite structure combines a strong, hard, low-friction skin with a soft underlying layer that collectively provide good abrasion resistance. In one aspect, the composite structure may be formed of elastomeric materials with an optical profile suitable for retrographic sensing. However, the resulting composite may also or instead be advantageously employed in a range of applications such as gaskets, seals, clamps, robotic end effectors, and the like that would benefit from a pliable, abrasion resistant contact surface.

20 Claims, 6 Drawing Sheets

Related U.S. Application Data

(60) Provisional application No. 63/228,279, filed on Aug. 2, 2021.

(52) U.S. Cl.
CPC ..... *B32B 2250/02* (2013.01); *B32B 2307/412* (2013.01); *B32B 2307/536* (2013.01); *B32B 2307/54* (2013.01); *B32B 2307/554* (2013.01); *B32B 2307/5825* (2013.01); *B32B 2307/7376* (2023.05)

(58) Field of Classification Search
CPC ....... B32B 27/08; B32B 27/283; B32B 27/40; B32B 3/266; B32B 7/022; B32B 7/12
See application file for complete search history.

(56) References Cited

U.S. PATENT DOCUMENTS

| | | | |
|---|---|---|---|
| 8,893,561 | B2 | 11/2014 | Gorjanc et al. |
| 9,238,346 | B2 | 1/2016 | Roy et al. |
| 10,965,854 | B2 | 3/2021 | Rohaly et al. |
| 2002/0120067 | A1* | 8/2002 | Soane .................. C08L 51/006 525/242 |
| 2013/0033595 | A1 | 2/2013 | Adelson et al. |
| 2016/0200882 | A1 | 7/2016 | Bhat et al. |
| 2021/0215474 | A1 | 7/2021 | Adelson et al. |

FOREIGN PATENT DOCUMENTS

| | | |
|---|---|---|
| CN | 112590333 | 4/2021 |
| JP | 10-315369 | 12/1998 |
| WO | WO-2023014693 | 2/2023 |

OTHER PUBLICATIONS

ISA/EP, "PCT Application No. PCT/US22/39138 International Search Report and Written Opinion mailed Nov. 9, 2022", 10 pages.
CNIPA, , "CN Application No. 202280066750.1 Office Action mailed Dec. 11, 2025", English and Chinese Translations NPL-84 , 32 pages.
EPO, , "EP Application No. 22786562.3 Communication Pursuant to Article 94(3) mailed Jan. 30, 2026", , 6 pages.
JPO, "JP Application No. 2024-506,249, Office Action mailed Jul. 21, 2026", with English translation, 8 pages.

* cited by examiner

ABRASION-RESISTANT COMPOSITE

CROSS-REFERENCE TO RELATED APPLICATIONS

This application is a bypass continuation that claims priority to International Patent App. No. PCT/US22/39138 filed on Aug. 2, 2022, which claims priority to U.S. Prov. App. No. 63/228,279 filed on Aug. 2, 2021, where the entire content of each of the foregoing is hereby incorporated by reference.

TECHNICAL FIELD

This disclosure generally relates to abrasion-resistant composite structures.

BACKGROUND

It is often desirable to use a soft elastomeric pad to contact an object. For example, a robotic finger may be equipped with a soft pad on its fingertip for grasping objects. Similarly, a retrographic sensor uses a clear elastomer with a reflective coating to capture three-dimensional surface data from objects in contact with the sensor. After numerous repeated uses, such devices may show wear due to contact with rough objects or environmental dirt or grit, eventually becoming unusable and requiring replacement. There remains a need for contact pads that can resist abrasion during repeated use, e.g., as a retrographic sensor or a contact pad in a robotic system.

SUMMARY

A composite structure combines a strong, hard, low-friction skin with a soft underlying layer that collectively provide good abrasion resistance. In one aspect, the composite structure may be formed of elastomeric materials with an optical profile suitable for retrographic sensing. However, the resulting composite may also or instead be advantageously employed in a range of applications such as gaskets, seals, clamps, robotic end effectors, and the like that would benefit from a pliable, abrasion resistant contact surface.

In one aspect, a device for abrasion resistant contact with a target surface disclosed herein may include: a support structure; a substrate disposed on the support structure, the substrate having a first Shore A hardness of no more than ten, and a first thickness of at least one millimeter; and a film disposed on the substrate for contact with the target surface. The film may include: a second Shore A hardness of at least seventy, a second thickness not exceeding two hundred microns, a tensile strength of at least thirty Megapascals, an elongation at break of at least six hundred fifty percent, and a kinetic coefficient of friction against matte steel not exceeding 1.5. The film may include a thermoplastic polyurethane, a thermoset polyurethane, or a nitrile rubber.

In one aspect, a device for abrasion resistant contact with a target surface disclosed herein may include: a support structure; a substrate disposed on the support structure, the substrate having a first Shore A hardness of no more than ten, and a first thickness of at least one millimeter; and a film disposed on the substrate for contact with the target surface. The film may include: a second Shore A hardness of at least fifty, a second thickness not exceeding five hundred microns, a tensile strength of at least ten Megapascals, an elongation at break of at least three hundred percent, and a kinetic coefficient of friction against matte steel not exceeding 1.5.

The film may include a thermoplastic polyurethane, a thermoset polyurethane, or a nitrile rubber.

In one aspect, a device disclosed herein may include: a substrate including a first elastomer with a first hardness; and a film including a second elastomer covering a first surface of the substrate of the first elastomer. The second elastomer may include: (a) a second hardness greater than the first hardness of the first elastomer; (b) a high strength; and (c) a low coefficient of friction on a second surface facing away from the first surface of the substrate of the first elastomer.

Implementations may include one or more of the following features. The high strength of the second elastomer may include a tensile strength greater than the first elastomer. The high strength of the second elastomer may include a tear strength greater than the first elastomer. The first elastomer and the second elastomer may be configured to provide an abrasion resistant elastomeric pad. The first elastomer may have a Shore A hardness not exceeding twenty. The first elastomer may have a Shore A hardness not exceeding five. The second elastomer may have a Shore A hardness of at least thirty. The second elastomer may have a Shore A hardness of at least fifty. The film may have a thickness between 5 microns and 1000 microns, inclusive. The film may have a thickness between 20 microns and 400 microns, inclusive. The film may have a thickness not exceeding 500 microns. The film may have a thickness not exceeding 200 microns. The substrate of the first elastomer may have a thickness greater that 500 microns. The substrate of the first elastomer may have a thickness of at least one millimeter. The second elastomer may have a tensile strength of at least ten Megapascals. The second elastomer may have a tear strength of at least twenty kiloNewtons per meter. The second elastomer may have a tensile strength of at least thirty Megapascals. The second elastomer may have an elongation at break of at least three hundred percent. The second elastomer may have an elongation at break of at least eight hundred percent. The first elastomer may include at least one of a polydimethylsiloxane, a polyurethane, and a thermoplastic elastomer. The second elastomer may include a polyurethane. The second elastomer may include a thermoplastic polyurethane. The second elastomer may include a nitrile rubber. The first elastomer may be optically clear. The device may further include a rigid, optically clear support structure for the first elastomer. The rigid, optically clear support structure may be formed of at least one of a quartz, an acrylic, a glass, a polystyrene, an epoxy, a polycarbonate, a polyurethane, a polyethylene terephthalate (PET), a polyethylene terephthalate glycol-modified (PET-G), and a polyvinyl chloride (PVC). The device may further include a uniform opaque layer between the first elastomer and the second elastomer. The device may further include an illumination system positioned to illuminate the first elastomer and an imaging system configured to capture an image of the uniform opaque layer through the first elastomer. The device may further include a flexible support structure for the first elastomer. The device may further include a robotic finger, where the first elastomer and the second elastomer form a contact pad for the robotic finger. The device may further include a rod passing through an opening, where the first elastomer and the second elastomer are formed into an annular fluidic seal for the rod in the opening. The film may include a low friction coating. The film may include an opaque layer. The device may further include a bonding layer between the substrate of the first elastomer and the film including the second elastomer. The first hardness of the first elastomer may not not exceed a Shore A hardness of five, where the substrate of the first elastomer has a thickness between the film and a support structure of at least one millimeter. The film may have a thickness not exceeding 500 microns, where the second elastomer has a Shore A hardness of at least fifty, a tensile strength of at least ten Megapascals, an elongation at break of at least three hundred percent, and a kinetic coefficient of friction against a steel matte surface not exceeding 1.5. The first elastomer may not exceed a first Shore A hardness of five, where the second elastomer has a second Shore A hardness of at least seventy, an elongation at break of at least eight hundred fifty percent, and a tensile strength of at least thirty Megapascals. The film may have a thickness between 10 and 500 microns, inclusive. The film may have a thickness between 30 and 200 microns, inclusive. The film may have a thickness between 50 and 100 microns, inclusive. The second hardness of the second elastomer may be a second Shore A hardness at least ten times greater than a first Shore A hardness of the first elastomer. The second surface of the film may provide a contact surface having a composite abrasion resistance greater than an abrasion resistance of the first elastomer alone or the second elastomer alone. The composite abrasion resistance may be at least fifty percent greater than the first elastomer alone or the second elastomer alone. The composite abrasion resistance may be at least one hundred percent greater than the first elastomer alone or the second elastomer alone. The composite abrasion resistance may be at least two hundred percent greater than the first elastomer alone or the second elastomer alone. The composite abrasion resistance and the abrasion resistance of the first elastomer and the second elastomer may be measured as a time to rupture under a twenty gram load against a belt sander with 200 grit sandpaper running at 1900 feet per minute. The composite abrasion resistance and the abrasion resistance of the first elastomer and the second elastomer may be measured according to a standardized abrasion test.

In one aspect, a method disclosed herein may include: providing a support structure; disposing a substrate on the support structure, the substrate including a first elastomer with a first hardness; and disposing a film of a second elastomer on a first surface of the substrate of the first elastomer, the second elastomer having a second hardness greater than the first hardness of the first elastomer, where the second elastomer has a low coefficient of friction on a second surface facing away from the first surface of the substrate of the first elastomer, and where the second elastomer has a high strength and high elasticity.

BRIEF DESCRIPTION OF THE DRAWINGS

Embodiments of devices, systems, and methods described herein are shown in the following drawings. The drawings are not necessarily to scale, emphasis instead being placed upon illustrating the principles of this disclosure.

DETAILED DESCRIPTION

Figure 1:
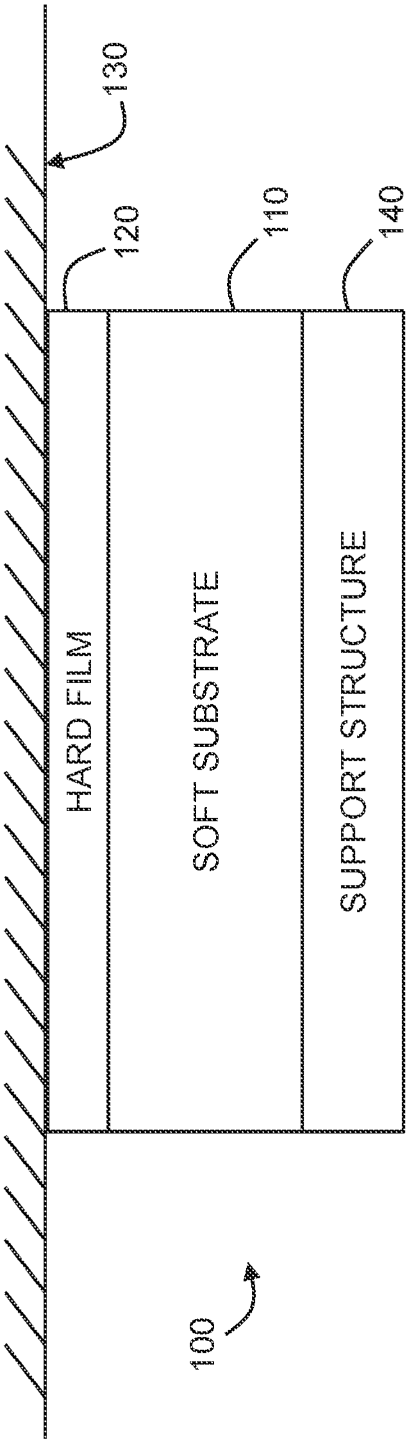
FIG. 1 shows a cross-section of an abrasion-resistant composite structure.

All documents mentioned herein are incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein. Each separate value within such a range is incorporated into the specification as if it were individually recited herein. It should also be understood that various numerical ranges and values for material properties are provided herein and described as suitable for abrasion-resistant composites. These values are derived from a combination of reported material properties, experimental results, and/or estimates based on any of the foregoing and observed abrasion resistance properties, and are intended to generally describe values or ranges of values where the composite structure exhibits superior abrasion resistance as compared to its individual, constituent components.

The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, terms such as "first," "second," "top," "bottom," "up," "down," and the like, are words of convenience and are not to be construed as limiting terms unless specifically stated to the contrary.

The devices, systems, and methods described herein may include, or may be used in an optical sensor such as any of the retrographic sensors described in U.S. patent application Ser. No. 14/201,835 filed on Mar. 8, 2014, U.S. Pat. No. 9,127,938 granted on Sep. 8, 2015, and U.S. Pat. No. 8,411,140 granted on Apr. 2, 2013. The entire contents of each of the foregoing are hereby incorporated by reference. In certain aspects, the devices, systems, and methods described herein may be used in as a retrographic sensing contact pad for a robotic tool, or in a retrographic sensor designed for repeated use on abrasive surfaces. However, the devices, systems, and methods described herein may also or instead be included in, or otherwise used with, other systems, such as any system that might advantageously incorporate a pliable, abrasion-resistant contact surface.

FIG. 1 shows a cross-section of an abrasion-resistant composite structure. In general, the structure 100 may include a substrate 110 formed of a soft material such as a soft elastomer and a film 120 formed of a strong, hard material such as a hard elastomer file. The film 120 may, for example, be an elastomer harder than the substrate 110, that covers, at least in part, the substrate 110. For example, the film 120 may cover an entire top surface of the substrate 110, thus providing a working surface for using the abrasion-resistant composite structure 100. The film 120 preferably has a relatively low coefficient of friction (COF) to facilitate sliding across a contact surface 130 in a manner that resists abrasion. This two-layer composite structure may advantageously form a pliable, abrasion-resistant contact pad that can conform to a target surface while resisting damage due to contact with abrasive materials on the target surface. It will also be appreciated that, while elastomers provide a range of materials with suitable mechanical properties for the substrate 110 and the film 120, other materials may also or instead be used. For example, the substrate 110 may be formed of a fluid that is contained within a volume bounded in whole or in part by a hard elastomer film 120, or any other thin film of a suitably strong and elastic material.

In general, the film 120 and substrate 110 may be supported by a support structure 140 that provides structural, mechanical support for the composite structure 100 so that, e.g., the composite structure 100 can be placed or otherwise manipulated for an intended use. The support structure 140 may, for example, include a rigid, optically clear plate for use in optical sensing applications, or a robotic element such as a robotic finger or other robotic effector for use in robotic manipulation of target objects using the composition structure 100, e.g., as a gripping surface. More generally, the support structure 140 may include any rigid structure, semi-rigid structure, flexible structure, or combination of these suitable for an intended application. For example, in a retrographic sensor or similar optical sensing device or system, the support structure 140 may include a 10-20 millimeter thick optically clear polyethylene terephthalate or polycarbonate that, while generally rigid, can also be flexed somewhat, e.g., to conform to a target surface.

Figure 2:
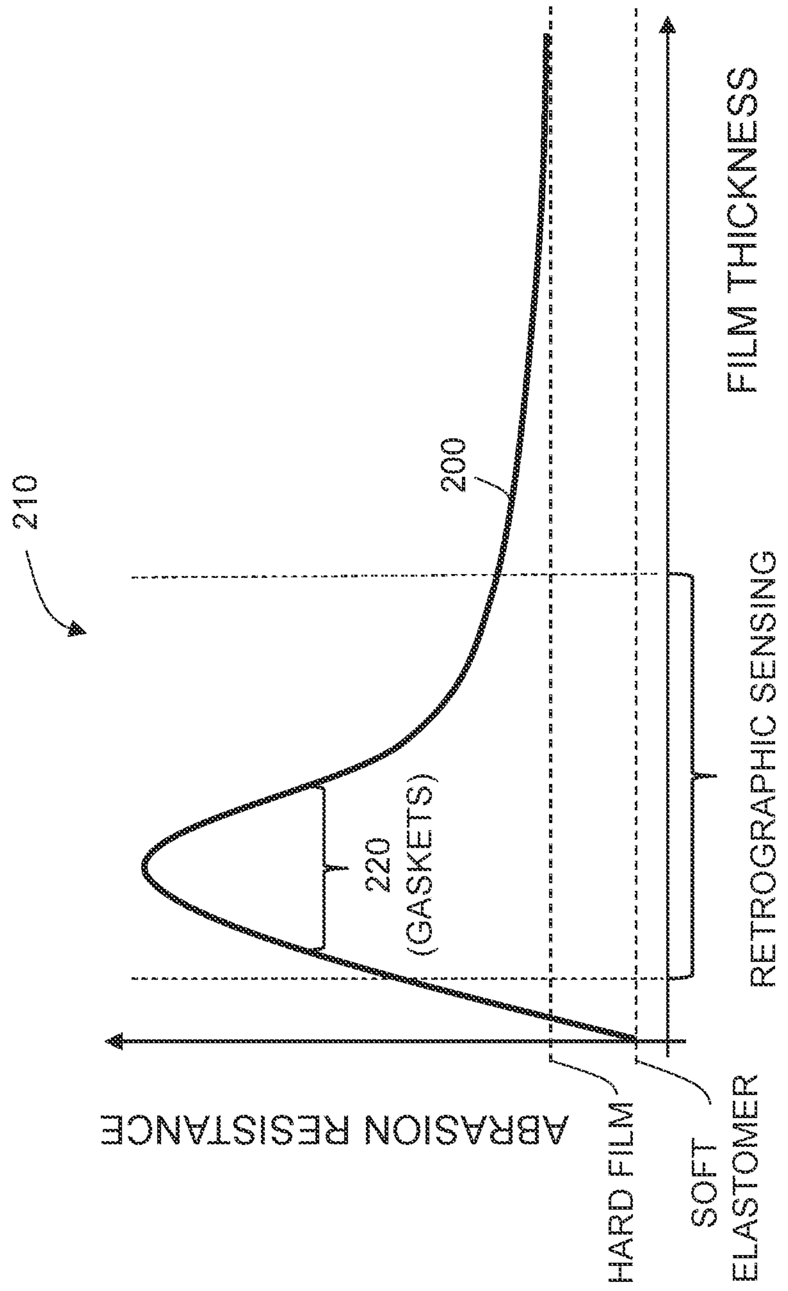
FIG. 2 illustrates abrasion resistance of a composite structure.

FIG. 2 illustrates abrasion resistance as a function of film thickness for a composite structure such as that illustrated in FIG. 1.

In general, the x-axis shows a thickness of a hard film placed over a soft substrate, such as the film described above, or any other suitable external surface material. This material coats a soft underlying substrate such as a soft elastomer. Film thickness may be measured using any suitable dimensions for depth of the hard film on the soft substrate. For example, film thickness may be measured in microns, centimeters, inches, and the like.

The y-axis shows abrasion resistance. This may be measured using any suitable metric or figure of merit that increases as the resistance to abrasion increases. For example, abrasion resistance may be measured in units of time, e.g., for a rupture or exposure of the soft elastomer to occur under standardized continuous wear conditions. For example, this may be exposure of the thin film to an abrading surface such as a sandpaper with a predetermined grit moving on a belt sander at a predetermined speed under a predetermined normal force. In another aspect, abrasion resistance may be measured as an inverse of a decrease in a measurable property of the film such as a decrease in film thickness, or a loss of weight or volume of thin film material, e.g., under standardized loading conditions. More generally, any objective wear testing method(s) known in the art and suitable for comparing wear rates for composites having films of various thicknesses may be used to measure abrasion resistance as contemplated herein.

As illustrated by a curve 200, abrasion resistance may vary as a function of the thickness of the hard film disposed on the soft substrate. It will be appreciated that the shape of the curve 200 is not exact and is not representative of any particular material or combination of materials, and that the shape and magnitude of the curve will vary according to particular material selections and physical arrangements. Instead, the curve 200 is intended to generally illustrate an unexpected relationship between film thickness and abrasion resistance that has been discovered by the inventors while testing various combinations of materials as described herein. In particular, it will be noted that for relatively thick exterior films (on the far right in FIG. 2), an abrasion resistance of the composite material approaches an abrasion resistance characteristic of the thick film as a bulk material. Conversely, as the depth of the film approaches zero, the abrasion resistance of the composite material approaches an abrasion resistance characteristic of the underlying soft elastomer. Between these extremes, there appears to be a range of film thicknesses for which a hard elastomer film on a soft elastomer substrate collectively demonstrate a surprising increase in abrasion resistance that exceeds the bulk property of either material in isolation, and in some cases dramatically exceeds this abrasion resistance. For certain material selections, improvements in an objectively measured abrasion resistance such as time to rupture or an inverse of material loss, may exceed 50%, 100%, 200%, or more above the abrasion resistance of constituent materials. For several combinations of common, commercially available elastomers and other materials such as those described herein, this provides a useful working range 210 of composite structures that can advantageously be employed with good optical performance and improved abrasion resistance in retrographic sensing, tactile sensing, robotic handling, and the like. The high abrasion resistance may also advantageously be employed to fabricate devices for other applications such as gaskets, fluidic seals, and so forth. It will also be understood that a useful working range may be different for different intended uses. For example, a second working range 220 might be suitable for high-pressure, high-cycle mechanical gaskets.

A few additional, preliminary notes on these composite materials are provided here, with detailed experimental data for certain embodiments provided below.

First, as noted above, the shape of the curve 200 is intended to illustrate a general relationship rather than experimental data for any particular combination of materials. Thus, for example, while the illustrative curve 200 monotonically increases to a peak from both sides, there may be discontinuities or changes in the polarity of the relationship under certain conditions and/or for certain materials. More generally, there appears to be a complex interrelationship among properties of the materials used in the composite, and effective variables include at least the thickness, strength, elasticity, hardness, and coefficient of friction of the film, and the hardness of the substrate. Although not all combinations of these parameters have been characterized, the general relationship appears to be consistent among combinations of materials that have been tested. For example, although not illustrated in FIG. 2, a lower coefficient of friction on an exterior of the film appears to increase abrasion resistance, and a higher strength and elasticity of the film appears to increase abrasion resistance.

Second, a number of abrasion resistance tests are known in the art, and may be used to compare abrasion resistance of various materials and composite structures as described herein. For example, American Society for Testing and Materials (ASTM) abrasion test ASTM D-1044, also referred to as Taber Abrasion, is a standard test used to determine a plastic's resistance to abrasion. While this provides a useful, objective benchmark for comparing abrasion rates, other standardized or custom testing protocols may also or instead be employed, provided they offer a consistent basis for comparing abrasion rates among different materials and/or composites. The quantitative results of experimental data would be expected to vary according to the selected testing technique(s), however the general relationship is expected to remain the same, and is expected to consistently demonstrate a composite material having a significant increase in abrasion resistance over any of its constituent materials individually.

In general, the film may advantageously be formed of a material that is strong, hard, and elastic. The elasticity (measured, e.g., in, elastic limit (%), stress at elongation, or the like) characterizes the ability of the film to bend and stretch to conform to a rough contact surface and reduce or mitigate points of high local stress. Various objective measures of elasticity are provided in Table 2 below. At the same time, the high strength (measured, e.g., as tear strength (e.g., kN/m, measured per ASTM D624 type C), tensile strength (e.g., MPa, measured per ASTM D412), elongation at break (%), or any other objective measure) permits the film to undergo these deformations without tearing or otherwise breaking, particularly where a thin film is desired, e.g., so that the composite structure can retain its structural integrity while deforming. Various objective measures of strength are provided in Table 1 below.

It will be understood that some of the foregoing material properties, such as elongation at break, may be considered a measure of strength (e.g., by specifying a breaking point) or elasticity (e.g., by specifying degree of deformability). However, whether a particular metric describes strength or elasticity is generally less important than whether the measured property contributes positively to abrasion resistance of a composite structure, more specifically by permitting the composite film to conform easily and robustly to a contact surface. Thus, while various metrics are categorized herein as measuring strength or elasticity, these should be understood as categories of convenience rather than strict definitional precision. Notwithstanding the foregoing, based on reported data, experimental data, and observations, it appears that a minimum useful tear strength for a film is about 20 kN/m, or about 20-30 kN/m, with films having a tear strength of 40 kN/m and above providing even better abrasion-resistant properties.

It will also be noted that different objective measures of strength and elasticity are generally (although not strictly) correlated to one another such that different objective measures of strength may be used as a proxy for identifying high-strength materials suitable for abrasion-resistant composites and different objective measure of elasticity may be used as a proxy for identifying high-elasticity materials. Furthermore, while the optimal combination of strength, hardness, and elasticity may vary according to other material properties such as the softness of the underlying elastomer, the nature of the rough, abrading contact surface, and other factors, it appears that strength and elasticity are generally positively correlated to improved anti-abrasion performance for different elastomer films having about the same hardness.

These principles can be exploited to particular advantage in certain applications. For example, a retrographic sensor may use a strong, thin film disposed on a soft elastomer. The film is preferably sufficiently thin to permit good conformance of the sensor to a contact surface, with thicknesses of thirty to eighty microns, or more generally about twenty to about two-hundred microns, or still more generally about five to about five-hundred microns, providing good physical relief and optical resolution for contact-based imaging applications. The applicant has observed that this range of thicknesses can also yield the desirable abrasion resistance qualities described herein. In general, within these ranges of values, a thicker film provides higher abrasion resistance and lower optical resolution. Thus, in one aspect, there is disclosed herein an abrasion resistant retrographic sensor having a thin film layer of 5-500 microns, 20-200 microns, or 30-80 microns, or any other range contained therein, disposed on a soft elastomer. It will also be noted that, as described below, a sensor may also include an optically reflective layer, e.g., on the soft elastomer side of the hard elastomer film, which may, in combination with the hard film, provide a layer over the soft elastomer of about fifty to about one-hundred microns-a thickness within the range described above that is useful for high-resolution imaging of a contact surface through the hard film. In another aspect, the thin film layer may be formed of an optically reflective layer suitable for retrographic sensing, thus omitting the need for a separate, opaque layer disposed thereon. An optical sensor formed of the composite materials described herein may also include adhesives, optical coatings, low-friction coatings, rigid substrates, and so forth, which may be included as additional layers and/or incorporated into the thin film layer (and/or soft elastomer). An embodiment of an abrasion resistant retrographic sensor according to these principles is now described in greater detail.

Figure 3:
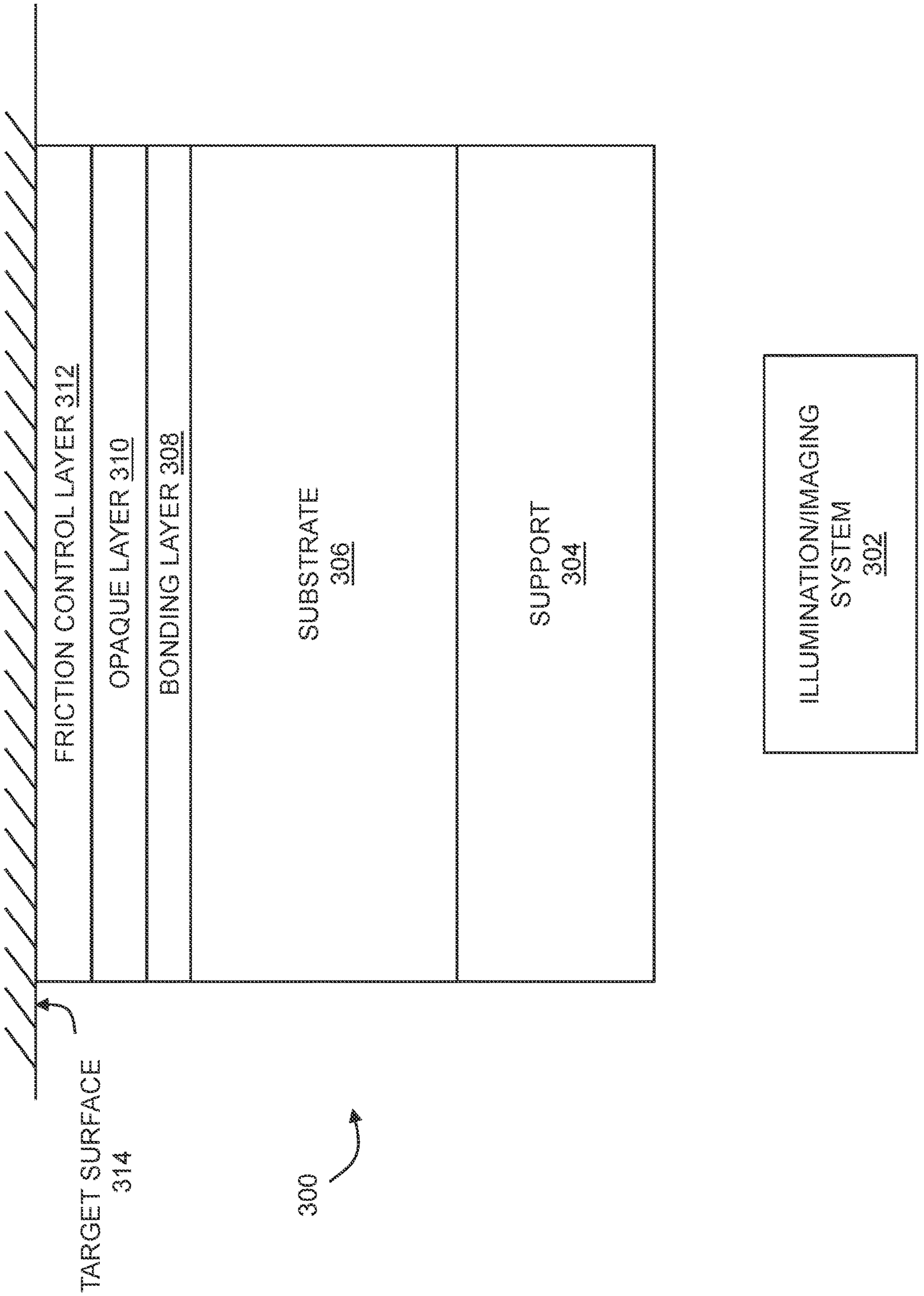
FIG. 3 shows a cross-section of a system including an abrasion resistant composite structure.

FIG. 3 shows a cross-section of a system including an abrasion resistant composite structure. The structure 300 may be a retrographic sensor with an abrasion-resistant contact surface, which may be integrated into any of the devices and systems described, for example, in U.S. Pat. No. 10,965,854, incorporated by reference herein in its entirety. In this context, the structure 300 may also include an illumination and imaging system 302 for use in capturing images and performing three-dimensional imaging of a target surface. More generally, the composite structure(s) described herein may be advantageously employed in any context where a deformable, abrasion-resistant contact surface might be useful, such as a gripper, end effector, or other mechanical handler or the like, that can be used to robotically manipulate items.

For a robotic finger with a retrographic sensor, the composite structure may generally include the layers illustrated in FIG. 3. For example, the structure 300 may include a support 304 formed of a rigid, optically clear material such as glass or clear polymethylmethacrylate or polycarbonate. The support 304 may also or instead include a semi-rigid material, flexible material, or combination of these, depending on the intended use of the structure 300. The structure 300 may also include a substrate 306 such as a layer of a soft, optically clear elastomer or the like disposed on the support 304. A bonding layer 308 may be provided to adhere the soft elastomer of the substrate 306 to one or more additional surface layers. For example, an opaque layer 310, which may contain scattering and/or reflecting pigments, or be coated or otherwise treated to provide an opaque surface for imaging, may be coupled by the bonding layer 308 to the substrate 306 of soft, clear elastomer, and may form a hard, elastic layer for abrasion resistance. A friction control layer 312 may be disposed on the opaque layer 312 to further manage anti-abrasion properties of the composite. In another aspect, the friction control layer 312 may include a hard, elastic, anti-abrasion layer disposed over the opaque layer 310, yielding a composite with the desired optical and mechanical properties. In one aspect, the friction control layer 312 may include a low-friction layer and a hard, elastic layer, which may be formed of a single, integral material or multiple layers of material. In another aspect, the friction control layer 312 may be formed of a single material or composite that combines the optical properties of the opaque layer 310, the low-friction properties of the friction control layer 312, and the hard, elastic properties of the friction control layer 312, thus providing a single layer of material bonded to or otherwise disposed on the substrate 306.

It will be understood that while FIG. 3 illustrates specific layers, the structure 300 may more generally comprise a soft, abrasion-resistant contact pad formed by covering a soft elastomer (or other material) with a film of a harder elastomer (or other material), where the harder elastomer has a relatively low coefficient of friction (COF)-such as the structure 100 shown with reference to FIG. 1. Such a composite material, when formed of suitable elastomers, is advantageously more abrasion resistant than a pad that is entirely comprised of either of the constituent elastomer materials, and depending on the materials, may be at least 50% more abrasion resistant, at least 100% more abrasion resistant, at least 200% more abrasion resistant, or more, as objectively measured using any suitable wear testing or abrasion resistance standard(s). Using a range of suitable elastomers, such a composite material may for example be configured for use as a retrographic sensor, e.g., with an optically clear or substantially optically clear elastomer (e.g., within a wavelength range used for imaging) that is sufficiently soft to deform to a contacted target surface and an opaque layer disposed therein that is harder, and can be illuminated through the clear elastomer and imaged to capture data for use in three-dimensional surface reconstruction.

The friction control layer 312 may include any suitably low-friction layer or composite immediately adjacent to a target surface 314 (e.g., between the target surface and other layers of the structure 300) to permit sliding and to relieve or mitigate points of concentrated contact force. In one aspect, a suitable low-friction or low stiction surface may be formed on the friction control layer 312 by spray coating. For example, this may include spraying a dilute solution of an (uncured) anti-abrasion coating (e.g., a polyurethane with about ten percent acrylate monomer by weight) and about two percent by weight of methyl silsesquioxane microspheres having a diameter of about ten microns onto the anti-abrasion coating. The spray coating may be applied in a manner that does not level upon drying, leaving an uneven, matte surface with contours formed in part by the microspheres to mitigate large, uniform, high-friction contact surfaces. The coating may be UV cured to cross-link the binder in the friction control layer 312 to the binder in the opaque layer 310, thus stabilizing the microspheres on the surface of the composite structure. The underlying opaque layer 310, or another hard, elastic layer between the opaque layer 310 and the friction control layer 312 may also include the microspheres, e.g., in similar proportions, in order to maintain a concentration of the friction-mitigating microspheres in a contact surface of the composite structure as the composite structure 300 is abraded. More generally, a variety of friction-reducing and stiction-reducing techniques are known in the art, and may be adapted to provide a low friction or low stiction contact surface for any of the composite structures described herein.

In general, a contact pad may be formed of any of the composite structures described herein, which may advantageously demonstrate superior abrasion resistance to any of the bulk materials forming the composite. For example, the hard film may be formed by a thermoplastic polyurethane (TPU) with a Shore A hardness of 70, which is relatively hard in this context. If a solid slab of this material is pressed against a belt-sander having a 200 grit belt with a predetermined contact force and run for 60 seconds, a measurable quantity of the TPU will be abraded away. However, if a 75 micron thick film of the same TPU is coated onto a volume of a soft elastomer, e.g., with a Shore A hardness of 5 (relatively soft in this context), the composite pad may, under the same contact conditions, show almost no abrasion at all. Stated more generally, a thin film of the TPU, when supported by a soft elastomer, will demonstrate greater abrasion resistance than a thick slab of the same TPU alone. FIGS. 4-8 illustrate the principles of operation of such an abrasion-resistant contact pad.

Figure 4:
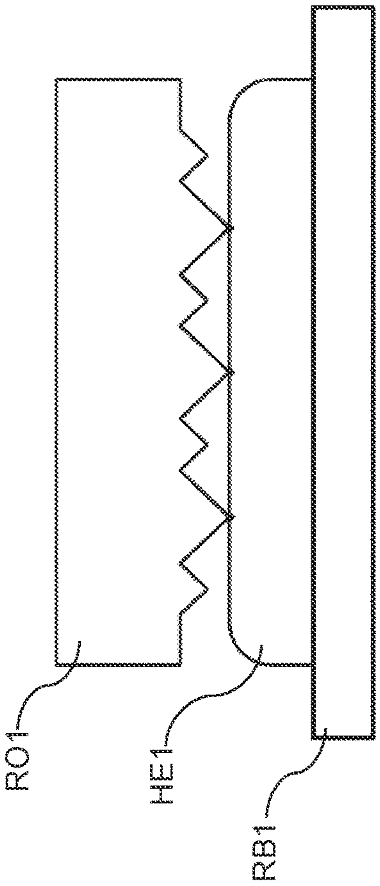
FIG. 4 illustrates a principle of operation of an abrasion-resistant contact pad.

FIG. 4 shows a rough object RO1 with sharp protrusions on the bottom. The object is pressed against a hard elastomer pad HE1, which is supported on a rigid block RB1. Each protrusion exerts localized force on the small patch of elastomer where it makes contact. Since the contact area for each protrusion is small, the local pressure is high. If the object is now moved tangentially, it will produce large local stress at the contact points, which can lead to local damage as the protrusions scrape over the pad.

Figure 5:
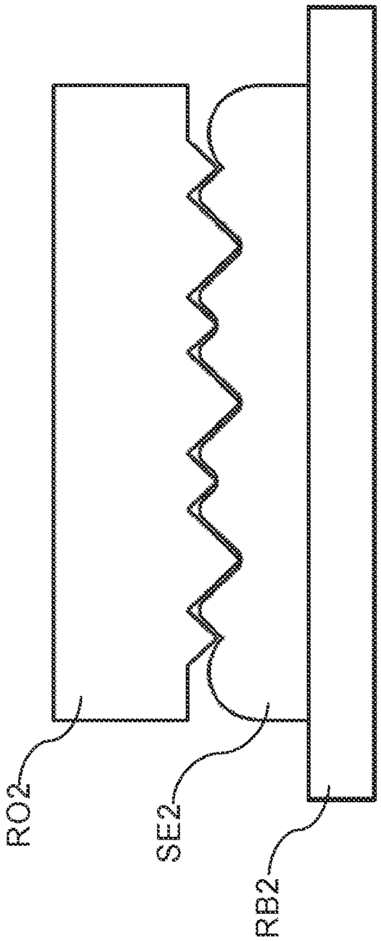
FIG. 5 illustrates a principle of operation of an abrasion-resistant contact pad.

FIG. 5 shows a rough object RO2 pressed against a soft elastomer pad SE2 which is supported by rigid block RB2. Since this pad is made of a soft material, it readily distorts to accommodate the rough texture of the object. The contact pressure is distributed over a large surface area rather than being concentrated in a few points, which reduces the tendency to produce high local stress when the object moves tangentially. However, soft elastomers typically have high COFs, which will increase the tangential forces during tangential motion. In addition, soft elastomers are typically mechanically weak and thus easily damaged, resulting in significant wear or damage when sliding under these conditions.

Thus, pads made of either hard or soft elastomers are both subject to damage from rough objects that rub across their surfaces, but for different reasons. The hard elastomer has the advantage of being strong and having a low COF, but the disadvantage of high local stress at sparse points of contact. The soft elastomer has the advantage of distributing the forces across a large area, thereby preventing points of high local stress, but has the disadvantage of being weak and having high frictional forces.

Figure 6:
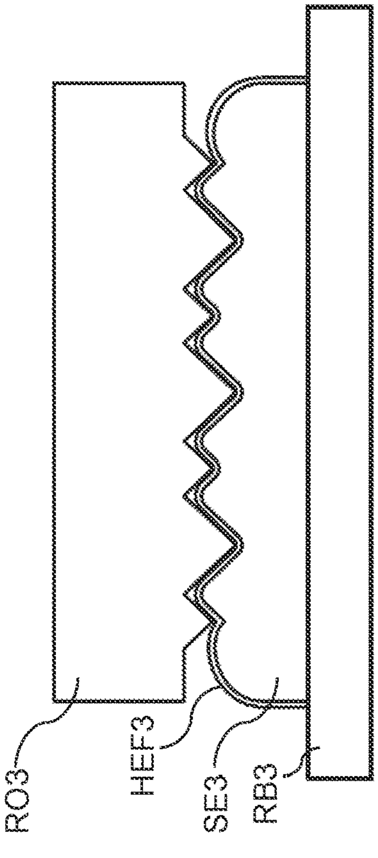
FIG. 6 illustrates a principle of operation of an abrasion-resistant contact pad.

FIG. 6 shows an abrasion resistant contact pad contacting a rough surface. In general, a film of a hard elastomer may cover a soft elastomer. The rough object RO3 is pressed against the composite pad which is made of a hard elastomer film HEF3 coated on a soft elastomer base SE3, supported by a rigid block RB3. If the film is thin and elastic, it will easily flex and stretch in order to follow the contours of the rough object, and thereby allow forces to be distributed over a large area. At the same time, the film will have the strength and the low COF associated with the hard elastomer, and thus will resist abrasion.

Figure 7:
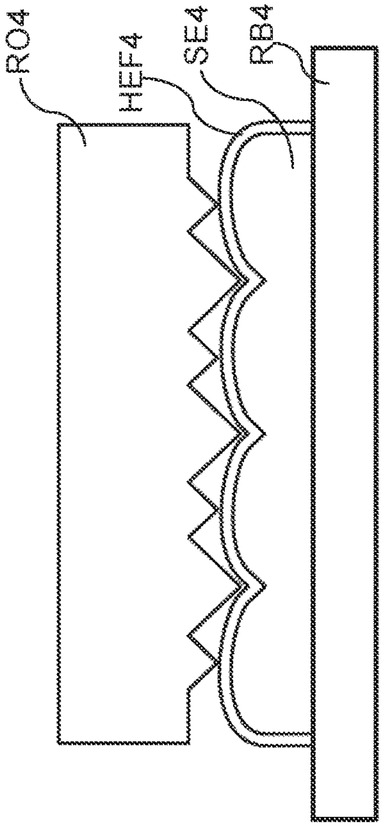
FIG. 7 illustrates a principle of operation of an abrasion-resistant contact pad.

FIG. 7 shows a contact pad with a thicker film of hard elastomer. In general, a rough object RO4 may be in contact with a hard elastomer film HEF4, which is coated on a base of soft elastomer SE4, supported on a rigid block RB4. This film, HEF4, is much thicker than the corresponding film in the previous example, HEF3. As a result of the excess thickness, the film is not sufficiently flexible and stretchable to follow the contours of the object's rough surface. This leads to a sparse set of contact points which have high local stress. Thus, an overly thick hard elastomer film will increase the tendency to forcibly engage with sharp or rough contact features and damage the contact pad. This also corresponds to the right-hand tail of the abrasion resistance curve illustrated in FIG. 2, where the abrasion resistance of the composite structure approaches the abrasion resistance of the film as the film thickness increases.

Figure 8:
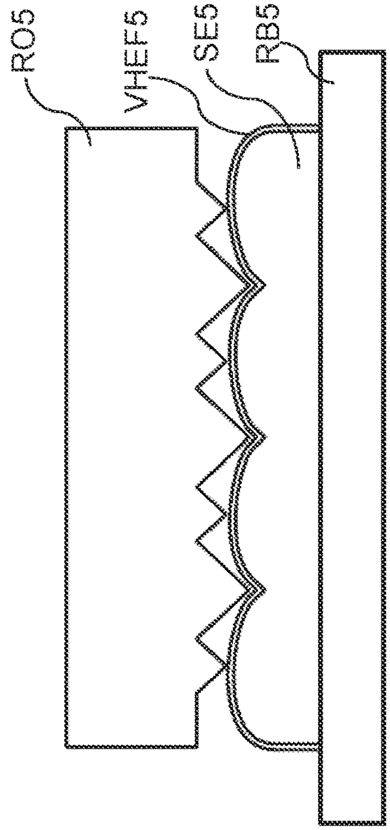
FIG. 8 illustrates a principle of operation of an abrasion-resistant contact pad.

In another aspect, a film that uses a very hard elastomer will not offer the best performance. FIG. 8 shows a rough object RO5 in contact with a very hard elastomer film VHEF5, which is coated on a soft elastomer SE5, mounted on a rigid block RB5. Even though this film, VHEF5, is just as thin as the film HEF3 in FIG. 6, it is too stiff to follow the contours of the rough object, resulting in a sparse set of contact points with high local stress that can damage the contact pad. Thus, where very high hardness implies low elasticity, or more generally, an inability to conform to a target surface, this may interfere with abrasion resistance for a composite structure.

In the above, terms such as "strength" or high strength" are used to describe various elastomers. It will be understood that there are multiple ways of specifying the strength of materials, including tensile strength and tear strength. In the case where a rough object is moving across an elastomeric pad, multiple aspects of mechanical strength may be important. While these various strength measures are generally correlated, they are not universally so, and it may be important in some cases to ensure that several different strength metrics are collectively sufficient for good abrasion resistance. Thus, when terms such as high strength, stronger, and so forth are used herein, it should be understood to refer to either a specific objective strength metric such as any of those described herein, where that material property is sufficient to ensure good abrasion resistance, as well as any combination of strength metrics that permit the composite structure to function as an abrasion-resistant contact pad.

In addition, although the general term "friction" is used, it will be understood that friction can be static or kinetic, and frictional interactions are non-linear in ways not captured by coefficients of friction (COFs). Moreover, friction is a characteristic of two specific materials making contact with one another, and the frictional forces against one material, such as glass, may be different than that the frictional forces against another material, such as steel. At the same time, frictional characteristics tend to be correlated, so that it is meaningful to speak of different elastomers as having higher or lower COFs, e.g., relative to a particular type of target surface for which the composite structure is intended.

Parameters that have been demonstrated to affect the abrasion resistance of the composite structure are now discussed.

Since the soft substrate that supports a hard film is not, itself, in direct contact with the object, the COF for the soft substrate is of no consequence for an intact composite structure. However, hardness, measured e.g., on a suitable Shore hardness scale, is a relevant metric for good abrasion resistance. For the substrate, a variety of soft elastomer families have been tested including silicone rubbers (PDMS), polyurethanes, and thermoplastic elastomers such as styrenic block copolymers. Any of these appear to function adequately as a substrate for a contact pad, provided they are appropriately soft. For example, useful abrasion resistant composite contact pads have been fabricated and tested using soft elastomers with a Shore A hardness below 10, although a harder elastomer may be used in various circumstances, for example where a modest reduction in abrasion resistance is acceptable, or where a harder and/or lower-friction film is employed. On the Shore 00 scale, useful soft elastomers for an abrasion-resistant contact pad appear to range between 20 and 65. Experimental data has not suggested any lower limit to this hardness, and as such, other extra soft gels, a fluid such as a non-viscous fluid, a gas, or the like may also or instead be used as a substrate for an abrasion resistant composite.

For the covering film, relevant parameters appear to include thickness, hardness (e.g., measured on a Shore hardness scale), strength (e.g., measured in tear strength, tensile strength, or similar objective measure(s)), elasticity (e.g., measured in elongation at yield, clastic limit, stress at elongation, and the like), and coefficient of friction (e.g., kinetic COF or static COF). For hardness, composite contact pads have demonstrated improved abrasion resistance (relative to constituent materials) using elastomers with a hardness between about Shore A 50 and Shore A 90. For a given hardness, different elastomers will have different combinations of strength, COF, and elasticity, yielding different abrasion-resistance characteristics. For high abrasion resistance, it appears generally useful for the hard elastomer to be strong and for it to have a low COF.

The coefficient of friction of the exterior, hard film may significantly impact abrasion resistance. For a number of materials, the coefficient of kinetic friction was measured against matte stainless steel, more specifically a 4.5 inch stainless steel drum with a finely sanded surface, rotated at 60 RPM. A hollow acrylic rod, 48 inches long, with square cross section, held the test sample. Each sample was attached to a point in the middle of the rod with polyurethane grip tape. The mounted sample was brought into contact with the rotating drum. The gravitational force from the rod provided a normal force, F1, measured at 2.1 Newtons. A spring dynamometer was used to measure the resulting frictional force, F2. The kinetic coefficient of friction was computed as F2/F1. It is noteworthy that the Elastollan TPU film and the Elkem PDMS film both have the same hardness (Shore A 70), but the PDMS coefficient of friction is over 300% higher than that of the TPU. All else being equal, this suggests that the TPU will yield a composite structure with superior abrasion resistance, a result that has been experimentally confirmed.

| Film type: | COF |
|---|---|
| TPU film (Silklon ES85) | 0.56 |
| TPU film (Elastollan 1170A10) | 0.9 |
| Nitrile glove (Dynarex) | 0.55 |
| Latex glove (Butler) | 1.2 |
| Vinyl glove (Foodhold) | 0.51 |
| PDMS film (Elkem Silbione 4370) | 2.6 |
| SEEPS TPE film (Septon 4099) | 2.8 |

To summarize, the choice of elastomer for the soft base does not appear critical as long as it is sufficiently soft. The choice of elastomer for the hard film does appear critical where abrasion resistance of the resulting composite depends on a combination of hardness, strength, elasticity, and coefficient of friction. At least two elastomers with favorable properties have been experimentally demonstrated to provide good abrasion resistance in composite pads:

polyurethane and nitrile rubber. In general, it will be understood that terms "soft" and "softer," as well as the complementary terms "hard" and "harder," are used to describe the relative hardness (or softness) of a base elastomer in a substrate and a covering film, and more specifically to suggest that the base elastomer is relatively softer and more pliable than the covering film. Some general ranges of softness and hardness are provided herein by way of objective measures using the Shore scales—however, other softnesses and hardnesses of materials may be used provided the composite structure generally has a substrate sufficiently soft to yield and mitigate sparse contact points with rough surfaces, and a sufficiently hard, thin, low-friction, clastic surface to conform to a contact surface in a manner that distributes surface contact and resulting contact forces. Thus, while specific numerical ranges are provided, other ranges and/or other elastomers or the like may also be used in combination to provide an abrasion-resistant composite structure, and are intended to fall within the scope of this disclosure except where explicitly noted to the contrary.

Subject to these general constraints, it appears that polyurethanes and nitriles, among others, provide suitable properties for an abrasion resistant composite. Polyurethanes generally have high strength, low coefficients of friction, and high elasticity, and appear to function well as a covering film. For example, polyurethane elastomers with Shore A hardness between 40 and 90 typically have elongations at break in excess of 400%.

Nitrile rubbers also score well on these dimensions. Most other elastomer families appear to fall short on these objective metrics, and when tested in composite structures, have provided less satisfactory abrasion resistance under test conditions. For example, PDMS is typically weaker than polyurethane and nitrile, and has a higher COF than polyurethane or nitrile. Thus, PDMS is worse than these two preferred materials on at least two dimensions, and performs worse as an abrasion-resistant coating for a soft elastomer. Latex films, such as are used in disposable latex gloves, have high strength and high elasticity but also high COFs. Flexible PVC films, such as are used in disposable vinyl gloves, have low COFs, but have low strength and low elasticity. Thermoplastic elastomers, such as the SEBS or SEEPS styrenic block copolymers, have high strength and high elasticity but have high COFs.

A number of working examples are now provided. A number of substrates were constructed from a soft PDMS elastomer (Smooth-on Eco-flex Gel) covered with a variety of hard elastomer films. The Ecoflex Gel is quite tacky, and so the films can be adhered directly to this substrate without any need for additional bonding agents. Films with various properties were obtained from commercial sources, as identified below. The PDMS film used Elkem LSR Silbione 4370, 1 part A, 1 part B, and 4 parts hexamethyldisiloxane, and was formed as a coating on a sheet of glass. After drying and curing the film was about 75 microns thick. To create the TPE film, a SEEPS block copolymer (Kuraray Septon 4099) was mixed with mineral oil in a ratio of about 1:1 and diluted with toluene in a ratio of about 1:4. This was poured onto a sheet of glass to form a Shore A 70 film that was about 75 microns thick after drying. To create the Elastollan TPU film, Elastollan 1170A10 (from BASF) was dissolved in tetrahydrofuran and poured onto a sheet of glass, forming a film about 80 microns thick after drying. The abrasion resistance of these substrate-film composite pads was tested by pressing them with a weight of 20 grams against a belt sander, which was running a 200 grit sanding belt at 1900 feet per minute (fpm). As the film wears under these conditions, it eventually reaches a point of catastrophic failure, rupturing as the sandpaper breaks through to the underlying soft elastomer. The times to failure were as follows:

| | |
|---|---|
| TPU film (Silklon ES85) | No visible damage at 60 seconds |
| TPU film (Elastollan 1170A10) | No visible damage at 60 seconds |
| Nitrile glove (Dynarex) | No visible damage at 60 seconds |
| Latex glove (Butler) | Rupture at <10 seconds |
| Vinyl glove (Foodhold) | Rupture at <5 seconds |
| PDMS film (Elkem Silbione 4370) | Rupture at <5 seconds |
| SEEPS TPE film (Septon 4099) | Rupture at <5 seconds |

Based on the foregoing measurements and the reported characteristics of the various corresponding materials, the films performed better where they had high strength, high elasticity, and low friction. In one aspect, polyurethanes, and more particularly, thermoplastic polyurethanes with high hardness, high elongation at break, and high tensile strength, provide a suitable material for abrasion resistant composites as described herein.

A second set of experiments were conducted utilizing a compound structure as illustrated in FIG. 3. Samples of polyurethane, polyurethane and acrylate mixtures, and nitrile rubber were tested as the anti-abrasion skin. For this testing, the soft elastomer included the thermoplastic elastomer Septon 4033, a SEEPS polystyrene block copolymer manufactured by Kuraray and plasticized by additives such as a mineral oil and Regalrez 1094, a tackifier manufactured by Eastman Chemical. The plasticizer level was 80% by weight of the soft gel with 40% from the oil and 40% from the tackifier. The hardness of the soft gel was measured as Shore 00=33. The thickness was 3 mm. The bonding layer and reflecting layer were both formulated with BASF Elastollan polyurethane 1170A10 for a combined thickness of 15 microns. The reflecting pigment was Sparkle Silver Ultra 7908 manufactured by Silberline.

The properties of the polyurethanes tested are summarized in Table 1 and 2, below. In general, American Society for Testing and Materials (ASTM) abrasion test ASTM D-1044, also referred to as Taber Abrasion, is a standard test used to determine a plastic's resistance to abrasion. While a variety of standardized abrasion tests are known in the art, this provides a useful benchmark for the properties of various elastomeric materials described herein.

TABLE 1

BASF Elastollan Properties (BASF Data)

| Material | Hardness (Shore A) | Tear Strength (kN/m) | Tensile Strength (MPa) | Abrasion * (mm^3) |
|---|---|---|---|---|
| 1170A10 | 71 | 45 | 30 | 45 |
| 1180A10 | 80 | 55 | 45 | 30 |
| 1185A10 | 87 | 70 | 45 | 25 |
| 1190A10 | 90 | 85 | 50 | 25 |

* Abrasion test ASTM D-1044

TABLE 2

| BASF Elastollan Properties (BASF Data) | | | | |
|---|---|---|---|---|
| Material | Elongation at break (%) | Stress at 20% elongation (MPa) | Stress at 100% elongation (MPA) | Stress at 300% elongation (MPa) |
| 1170A10 | 850 | 1.5 | 3.5 | 6.3 |
| 1180A10 | 650 | 2 | 4.5 | 8 |
| 1185A10 | 600 | 2.5 | 6 | 10 |
| 1190A10 | 550 | 5 | 9 | 16 |

Acrylates can be used to modify the hardness and elasticity of the polyurethanes. Acrylates may be particularly useful because they are molecularly compatible with polyurethanes and have been shown to be capable of forming interpenetrating 3-D networks upon polymerization. Such 3-D networks add strength and rigidity to materials and can facilitate bonding of adjacent layers by cross-linking chemically materials that spans such layers. The 3-D cross-linking network occurs by polymerization of the acrylate groups which can be readily accomplished by the incorporation of a UV initiator into the composition and UV irradiation after coating or casting. Acrylates are available in a broad range of chemical compositions including chemical structure, molecular weight, and number of acrylate functional groups per molecule. The strength of an interpenetrating 3-D network is dependent upon the cross-link density of the network, which can be controlled by the functionality or number of acrylate groups per molecule, the molecular weight between acrylate groups, and the mass concentration of acrylates used in the formulation. Difunctional polyurethane acrylates that are linear polyurethane oligomers with acrylate groups on the ends of each molecule may be particularly effective. These materials will form homogenous networks with polyurethanes. Thus in one aspect, a polyurethane may be modified with the addition of one or more acrylates to improve hardness and elasticity, and to improve the resulting abrasion-resistance properties of a composite structure using the polyurethane/acrylate mixture.

Table 3 below summarizes the properties of the Sartomer acrylate urethane oligomer found to be advantageous for testing. Note that as a polymerized homogenous material, it has an elongation of 140% which is significantly less than the 600% to 800% elongations of the polyurethanes to which it is being blended. Also, the tensile strength is similar to that of the polyurethanes. So, the blending of the acrylate with the polyurethane can be used to add rigidity and its polymerization can be used to bond adjacent layers which contain the acrylate.

TABLE 3

| Sartomer: Aliphatic Urethane Acrylate Oligomer | | | | |
|---|---|---|---|---|
| Material | appearance | elongation | functionality | tensile strength, MPa |
| CN9009 | Transparent Clear | 140% | 2 | 33.5 |

Samples of the polyurethane and the polyurethane acrylate mixtures to be tested were coated on a glass plate from the solvent THF (tetrahydrofuran). The coatings were peeled away from the glass, cut to shape and placed over the reflecting layer of the composite structure to be tested. The coatings are held in place by simple stiction or the tendency of two smooth samples to adhere on contact. The nitrile rubber samples are held in place manually for testing.

The abrasion resistance of contact pads formed using the materials discussed herein has been evaluated with manual tests by sanding the surface of composite pads with a belt sander and 120 grit sandpaper at a speed of 40 inches per second. The surface of each sensor was domed with a radius of curvature of about 3 inches. The domed sensor surface was held by hand against the moving belt with light to moderate pressure sufficient to cause a circular area of about ⅜-inch diameter to contact the moving sandpaper belt.

The elasticity of each sample was also evaluated by a simple test referred to here as an empirical elastic limit. For this test, a strip of the film was cut 1 cm wide and was stretched alongside a tape measure to note the length at which the strip exhibited significant resistance to additional stretching. This elongation is thought to be about the point at which the polymer chains are stretch out or uncoiled to their limit such that additional elongation would involve straining or breaking molecular bonds. Note that the empirical elastic limit as measured here is not the same measurement as the elasticity at break, which is the percentage of elongation at which point the material yields, or the conventional elastic limit, which is the point at which a material plastically or permanently deforms and loses its ability to elastically return to its original state. These measurements are all generally correlated, but the elasticity at break is significantly larger that the empirical elastic limit.

TABLE 4

| Belt Sanding Robot Sensor Skins BASF Elastollan Polyurethanes & Sartomer Polyurethane Acrylates (Cast films adhered by stiction to 2D sensor and belt sanded) (120 grit paper ⅜" diameter sanding spot, 10 minutes) | | | | |
|---|---|---|---|---|
| Sample | Acrylate Content (%) | 10 minute abrasion rate (microns/min) | empirical # elastic limit (%) | measured thickness (microns) |
| 1170A10 #1 | 0 | 0 | 525 | 37 |
| #2 | 0 | 0.25 | 525 | |
| 1180A10 | 0 | 0.25 | 475 | 40 |
| 1185A10 | 0 | 0.5 | 400 | 40 |
| 1190A10 | 0 | 0.9 | 375 | 45 |
| 1180A10#1 | 10 | 0.3 | 450 | 40 |
| #2 | | 0.5 | 450 | |
| 1170A10 #1 | 25 | 1.3 | 425 | 49 |
| 1180A10 | 25 | 0.9 | 390 | 49 |
| 1185A10 ** | 25 | 2.4 | 350 | 54 |
| 1190A10 * | 25 | 3.8 | 300 | 50 |

% elongation measured until very firm resistance
* ruptured at 5 minutes and 31 microns thickness
** ruptured at 9 minutes and 32 microns thickness Note as demonstrated in Table 4, the acrylate concentration associated with the best performance is currently determined to be 0% acrylate, and that the rate of skin loss from sanding at this level is remarkably low-about 0 to 0.25 microns per minute of sanding with 120 grit sandpaper moving at 40 inches per second. A skin of 100 microns thickness, which is reasonable for a robot finger, would last for many hours subjected to this type of sanding.

Note also from Table 4 that the abrasion resistance decreases in progressing through the series of materials as the hardness of the polyurethane increases, which is counterintuitive. Note from Table 1 above that the abrasion resistance of the solid polyurethane increases in progressing through the Elastollan grades from softer to harder. This improved abrasion resistance with increased hardness is common for solid elastomers.

Note also that the addition of the urethane acrylate decreases abrasion resistance. The acrylate is bifunctional-that is, it has two acrylate groups per molecule and when exposed to UV radiation in the presence of an UV initiator it will crosslink with itself forming a three dimensional structure which results in increased hardness and decreased elasticity of the polymerized or UV cured mixtures. For a solid sample, it would be expected to improve abrasion resistance from the presence of the acrylate 3D structure as it increases strength just as the higher durometer Elastollans have higher strength, but just the opposite is observed-a decrease in abrasion resistance.

Two samples of Nitrile rubber were tested, and the data is summarized in Table 5 below.

TABLE 5

Nitrile Rubber from laboratory gloves (2D sensor inserted into glove thumb, firmly held in place and belt sanded) (120 grit paper, 3/8" diameter sanding spot, 10 minutes)

| Sample | Acrylate Content % | 10 minute abrasion rate microns/min | measured # elastic limit, % | measured thickness microns |
|---|---|---|---|---|
| Black Nitrile * | 0 | 2.2 | 375 | 67 |
| Blue Nitrile | 0 | 2.2 | 400 | 106 |

* test stopped at 5.5 minutes, crease developed in sample from sanding.
Black Nitrile: Sysco High Performance Black Nitrile Gloves, Sysco Corp.
Blue Nitrile: Microflex Supreno SE, Ansell Healthcare Products LLC For this testing, the nitrile rubber samples were obtained from samples cut from laboratory gloves. It is possible to stretch sections taken from the thumbs of the gloves over a dome shaped robot finger sensor and hold the sample in place while subjecting the surface thus formed to the sanding test. The results indicate an abrasion resistance that is remarkably good and similar to that found for many of the combined polyurethane/acrylate samples, though not as good as the pure polyurethane samples. Note also that the two samples tested are quite different in thickness yet the abrasion resistance is equivalent between the two samples. If these same samples are stretch over a domed hard acrylate shape such as a convex lens and held against the sanding belt, they fail in seconds by ripping.

Figure 9:
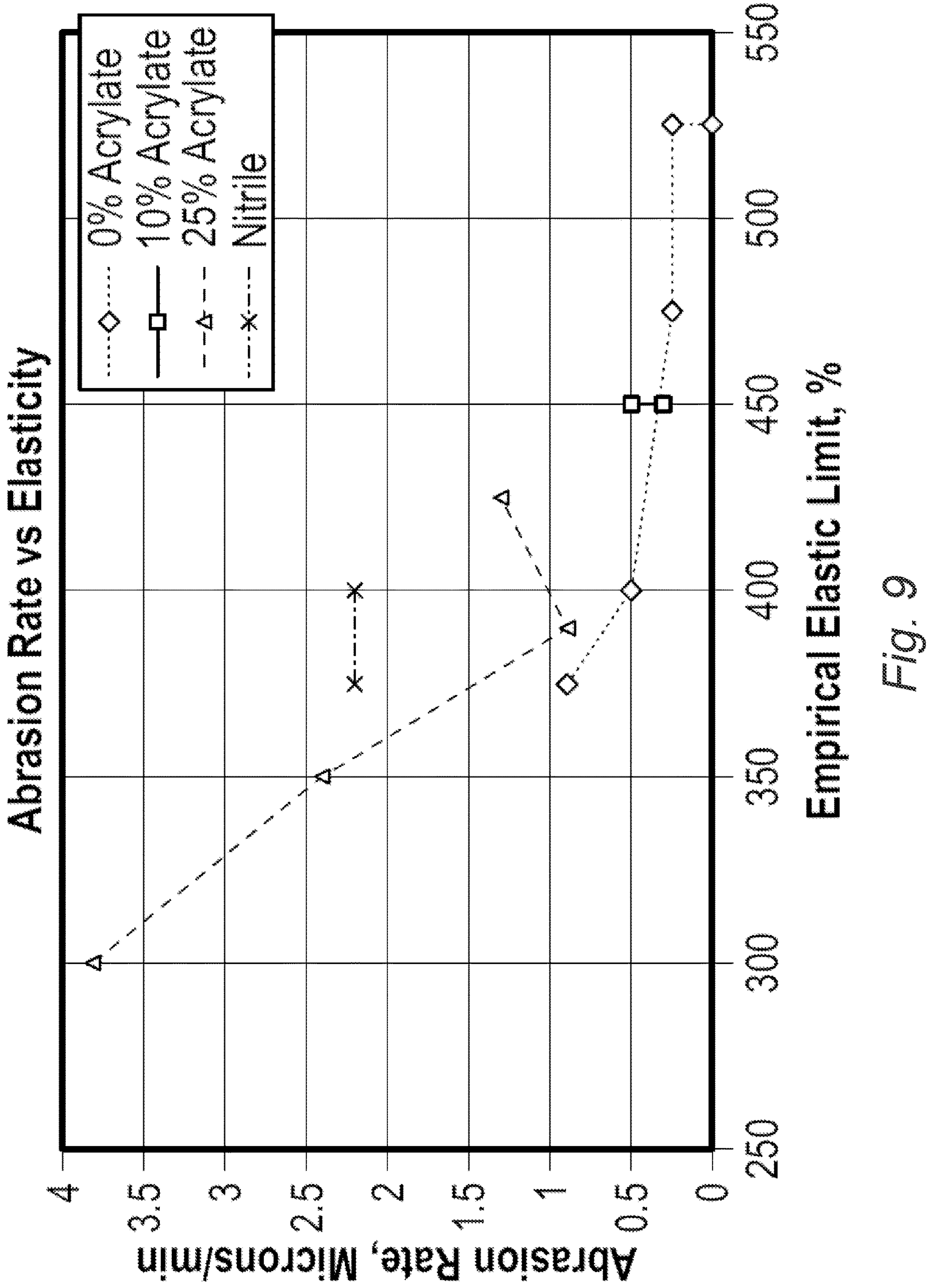
FIG. 9 illustrates abrasion rates for various composites as a function of the empirical elastic limit for a covering film.

FIG. 9 illustrates abrasion rates versus elasticity for various composites. More specifically, FIG. 9 illustrates the abrasion rate (in microns/minute) as a function of the empirical elastic limit measured for various materials used as a covering film. It will be noted that the abrasion performance (e.g., a decrease in abrasion rate) is generally correlated to the empirical elastic limit, with the best abrasion resistance provided by films having the highest empirical elastic limit, e.g., the greatest elasticity.

Contact pads fabricated using a composite structure as described herein may be used in a variety of applications. For example, these contact pads may be used on robot fingers or other manipulators. However, a non-rigid, abrasion resistant contact pad may usefully be deployed in many other contexts. For example, such a pad may be used in any situation where a soft or flexible object is in rubbing contact with a second object, especially in the case where there is no liquid lubricant. For example, the composite structure may be used as a seal for a moveable cylindrical shaft. In such embodiments, a chamber may be sealed to prevent gas from inside the chamber from mixing with gas from outside the chamber. The shaft may penetrate the wall of the chamber through an elastomeric annular seal, which, if made using a composite structure as described herein, may permit the shaft to rotate about its axis or translate along its axis while causing minimal abrasion. More generally, the abrasion-resistant composite may be formed into a gasket or other fluidic seal for moving parts, or any other gasket, seal, wiper or other component where abrasion resistance is desired for a mechanically loaded interface.

According to the foregoing, there are described herein anti-abrasion composite structures. By way of more specific examples, in one aspect, a device for abrasion resistant contact with a target surface having substantially improved abrasion resistance properties as described herein, includes a support structure; a substrate disposed on the support structure, the substrate having: a first Shore A hardness of no more than ten, and a first thickness of at least one millimeter; and a film disposed on the substrate for contact with the target surface, the film having: a second Shore A hardness of at least seventy, a second thickness not exceeding two hundred microns, a tensile strength of at least thirty Megapascals, an elongation at break of at least six hundred fifty percent, and a kinetic coefficient of friction against matte steel not exceeding 1.5.

Usefully improved abrasion-resistance performance may also or instead be obtained by a composite device including a support structure; a substrate disposed on the support structure, the substrate having: a first Shore A hardness of no more than ten, and a first thickness of at least one millimeter; and a film disposed on the substrate for contact with the target surface, the film having: a second Shore A hardness of at least fifty, a second thickness not exceeding five hundred microns, a tensile strength of at least ten Megapascals, an elongation at break of at least three hundred percent, and a kinetic coefficient of friction against matte steel not exceeding 1.5.

In the foregoing and other embodiments, the film may, for example, include a thermoplastic polyurethane, a thermoset polyurethane, or a nitrile rubber. The substrate may, for example, include at least one of a polydimethylsiloxane, a polyurethane, and a thermoplastic elastomer. It will also be appreciated that, the phrase "disposed on," as used in the preceding description, does not require direct contact between the two recited layers. That is, while the film is described as being disposed on the substrate, this does not require direct contact between the two layers or exclude intervening functional layers or the like. Instead, where one layer or structure is described as disposed on another, this permits and optionally includes one or more intervening layers including functional layers such as optical films, adhesive layers, patterned or textured surfaces, and so forth.

There is also disclosed herein a method for fabricating abrasion-resistant composites. This may generally include providing a support structure, such as any rigid or flexible support structure suitable for an intended application. This may, e.g., include a robotic finger, a lens or other optical element, a substrate for a retrographic sensor, a gasket, a contact pad, a wiper, and so forth. The method may include disposing a substrate on the support structure, the substrate including a first elastomer with a first hardness. The method may also include disposing a film of a second elastomer on a first surface of the substrate of the first elastomer, the second elastomer having a second hardness greater than the first hardness of the first elastomer, where the second elastomer has a low coefficient of friction on a second surface facing away from the first surface of the substrate of the first elastomer, and wherein the second elastomer has a high strength and high elasticity. In general, the support structure, elastomers, substrate, and film may be any as described herein. It will also be appreciated that the method may include any suitable manufacturing techniques such as casting, spin coating, mixing, curing, bonding, and so forth, as appropriate for a desired, resulting composite. All such techniques suitable for fabricating a composite, abrasion-resistant structure as described herein are intended to fall within the scope of this manufacturing method.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A device for abrasion resistant contact with a target surface, comprising:
- a support structure;
- a substrate disposed on the support structure, the substrate having:
  - a first Shore A hardness of no more than ten, and
  - a first thickness of at least one millimeter; and
- a film disposed on the substrate for contact with the target surface, the film having:
  - a second Shore A hardness of at least fifty,
  - a second thickness not exceeding five hundred microns,
  - a tensile strength of at least ten Megapascals,
  - an elongation at break of at least three hundred percent, and
  - a kinetic coefficient of friction against matte steel not exceeding 1.5.

2. The device of claim 1, wherein the film includes a thermoplastic polyurethane, a thermoset polyurethane, or a nitrile rubber.

3. A device comprising:
- a substrate including a first elastomer with a first hardness, wherein the first elastomer has a Shore A hardness not exceeding twenty; and
- a film including a second elastomer covering a first surface of the substrate of the first elastomer, the second elastomer having:
- (a) a second hardness greater than the first hardness of the first elastomer,
- (b) a tear strength greater than the first elastomer, and
- (c) a low coefficient of friction on a second surface facing away from the first surface of the substrate of the first elastomer.

4. The device of claim 3, the second elastomer has a tensile strength greater than the first elastomer.

5. The device of claim 3, wherein the first elastomer and the second elastomer are configured to provide an abrasion resistant elastomeric pad.

6. The device of claim 5, wherein the first elastomer has a Shore A hardness not exceeding five.

7. The device of claim 3, wherein the second elastomer has a shore A hardness of at least thirty.

8. The device of claim 3, wherein the second elastomer has a Shore A hardness of at least fifty.

9. The device of claim 3, wherein the film has a thickness between 5 microns and 1000 microns.

10. The device of claim 3, wherein the film has a thickness between 20 microns and 400 microns.

11. The device of claim 3, wherein the film has a thickness not exceeding 500 microns.

12. The device of claim 3, wherein the film has a thickness not exceeding 200 microns.

13. The device of claim 3, wherein the substrate of the first elastomer has a thickness greater than 500 microns.

14. The device of claim 3, wherein the first elastomer is optically clear, the device further comprising a rigid, optically clear support structure for the first elastomer.

15. The device of claim 3, wherein the film includes a coating formed by spray coating a dilute solution of an uncured polymer and silsesquioxane microspheres and curing the dilute solution to an uneven matte surface with contours formed in part by the silsesquioxane microspheres to mitigate uniform contact surfaces.

16. The device of claim 3, wherein the second surface of the film provides a contact surface having a composite abrasion resistance greater than an abrasion resistance of the first elastomer alone or the second elastomer alone.

17. The device of claim 16, wherein the composite abrasion resistance is at least fifty percent greater than the first elastomer alone or the second elastomer alone.

18. The device of claim 16, wherein the composite abrasion resistance is at least one hundred percent greater than the first elastomer alone or the second elastomer alone.

19. The device of claim 3, wherein the film includes an opaque layer.

20. The device of claim 3, further comprising a robotic finger, wherein the first elastomer and the second elastomer form a contact pad for the robotic finger.

* * * * *